Patented Sept. 11, 1934

1,973,300

UNITED STATES PATENT OFFICE 1,973,300

PURIFYING ZINC SULPHATE SOLUTIONS

Joseph Camillus Thompson, Jr., Palmerton, Pa., assignor to The New Jersey Zinc Company, New York, N. Y., a corporation of New Jersey No Drawing. Application January 4, 1932, Serial No. 584,759

7 Claims. (Cl. 23—125)

The present invention relates to the purification of zinc sulphate solutions, and has for its object an improved method of removing iron from such solutions.

Zinc sulphate solutions prepared by leaching zinc ores and other zinciferous materials with sulphuric acid are normally highly acid in their crude form, since the use of a substantial excess of sulphuric acid is usually necessary to secure adequate transformation in a reasonable time of the zinc content of the material to zinc sulphate. The presence of this excess sulphuric acid in the resulting zinc sulphate solution tends to hold in solution the impurities present, and to prevent their removal by precipitation. It is therefore necessary to neutralize this excess sulphuric acid with an appropriate base, prior to the removal from the solution of the metallic impurities, for example, iron, that along with the zinc have been dissolved from the zinciferous material by the sulphuric acid. Zinc oxide, for example in the form of roasted ore or refuse oxide, is a specially suitable base for neutralizing the excess sulphuric acid, since additional amounts of zinc sulphate are formed by its reaction with the excess sulphuric acid. Following such neutralization of the zinc sulphate solution, it has heretofore been the common practice to subject the solution to an oxidizing treatment (for example, aeration in the presence of a base) in the course of which there results a precipitate of iron in the ferric form. The iron precipitate is then removed from the solution by filtration or equivalent treatment.

In the commercial practice of purifying zinc sulphate solutions, it has been found that the iron precipitate (made up of ferric oxide and/or ferric hydroxide) resulting from the heretofore common oxidizing treatment is slimy and colloidal or semi-colloidal in nature, so that its removal from the zinc sulphate solution by sedimentation or filtration is extremely difficult. The present invention is particularly concerned with obviating this difficulty, and involves an improvement in the heretofore common practice of removing iron from zinc sulphate solutions in consequence of which the separation from the solution of the iron precipitate resulting from the oxidizing treatment is facilitated.

I have found that the primary cause of the slimy nature of the iron precipitate is the presence of a highly dispersed ferric iron precipitate formed in the solution during the step of neutralizing with zinc oxide (or other base) the excess sulphuric acid used in the leaching of the zinciferous material to produce the zinc sulphate solution. When the subsequent precipitation of iron by oxidation is carried out in the presence of this highly dispersed preliminary iron precipitate, the entire ferric iron precipitate formed during the oxidation treatment tends to remain in a highly dispersed form, difficult to settle and filter. I have further found that the formation during neutralization of the highly dispersed ferric iron precipitate is due to the presence of ferric ions in the original acid zinc sulphate solution, and that the difficulties encountered in the settling and filtration of the ferric iron precipitate formed during subsequent oxidation can be obviated by freeing the zinc sulphate solution of ferric compounds in solution or suspension therein prior to the oxidation treatment. Prior to neutralization, the ferric iron compounds in the crude zinc sulphate solution are present in solution, while after neutralization such compounds are present in suspension in the form of a highly dispersed or colloidal precipitate.

Based on these discoveries, the present invention involves freeing the zinc sulphate solution of iron in the ferric form prior to the usual oxidation treatment for the removal of iron. This may be accomplished by reducing the ferric iron in solution in the crude acid zinc sulphate solution (prior to neutralization) to ferrous iron, or by mechanical separatory treatment, such as filtration or sedimentation, of the neutralized zinc sulphate solution. The resulting zinc sulphate solution, thus freed of iron in the ferric form, is now subjected to an oxidizing treatment, preferably as highly accelerated as practicable. The resulting ferric iron precipitate is then removed from the solution in any appropriate manner, as for example, by filtration, sedimentation, or the like.

Reduction of ferric iron in the zinc sulphate solution to ferrous iron is effected by treating the solution with a reducing agent, prior to neutralization. Metallic iron or metallic zinc in the form of scrap is an appropriate reducing agent for the purpose. The solution can then be neutralized without the formation of a highly dispersed precipitate of ferric iron.

In case the ferric iron is not reduced to ferrous iron, prior to neutralization of the zinc sulphate solution, the highly dispersed precipitate of ferric iron formed during neutralization is removed by filtration prior to oxidation. The solution is then treated for the removal of the contaminating iron (now substantially all in the ferrous form) by oxidation. Rapid oxidation is desirable since it produces a more granular and more filterable precipitate. It is now my preferred practice to subject the zinc sulphate solution (freed of ferric iron as aforesaid) to oxidation in the following manner.

A copper compound, such as cupric sulphate, is added to the zinc sulphate solution, for example in concentrations of about 0.1 gram Cu per liter. A base, for example zinc oxide in the form of roasted zinc ore, is added to the solution to neutralize the sulphuric acid liberated by the subsequent oxidation and hydrolysis of the iron compounds. Usually, zinc oxide amounting to 150% of that theoretically required is preferable.

The solution is then oxidized, for example by injecting air into it in the form of extremely fine bubbles. Such bubbles may be produced by injecting the air by means of an eductor or by an air jet underneath a rapidly rotating impeller (e. g., 850 r. p. m. with a 12 inch impeller in a tank measuring 4 feet by 4 feet, by 4 feet, and containing 360 gallons of solution). I have found that very finely disseminated air bubbles cause rapid oxidation, resulting in the formation of a more granular and more readily settled and filtered precipitate than that obtained by methods of aeration that do not disperse the air to an extremely high degree. If the rate of oxidation tends to slow down appreciably during the last stages of the oxidation treatment, the addition of further amounts of a copper compound (e. g. copper sulphate) will again accelerate the oxidation. The temperature of the solution is preferably maintained between 70 and 80° C. during the precipitation, and should not be permitted to fall below 55 or 60° C.

It will be understood from the foregoing discussion that the present invention involves, in its complete and preferred form, first, the freeing of the zinc sulphate solution of iron in the ferric form, and second, rapid oxidation of the resulting solution. These two steps in combination make it possible to produce a ferric iron precipitate of good settling characteristics.

I claim:

1. The method of purifying an acid zinc sulphate solution containing ferric iron, which comprises converting the ferric iron to ferrous iron by the action of an appropriate reducing agent, adding zinc oxide in excess of the amount required to neutralize the solution, subsequently subjecting the solution to the oxidizing action of air in a finely disseminated state in the presence of said excess zinc oxide and thereby precipitating substantially all of the iron present in the solution, and removing the iron precipitate from the solution.

2. The method of purifying an acid zinc sulphate solution containing ferric iron, which comprises converting the ferric iron to ferrous iron by the action of an appropriate reducing agent, substantially neutralizing the acidity of the solution, subjecting the neutralized solution to a rapid oxidizing treatment in the course of which substantially all of the iron present in the solution is precipitated, and removing the iron precipitate from the solution.

3. The method of purifying an acid zinc sulphate solution containing ferric iron, which comprises converting the ferric iron to ferrous iron by the action of an appropriate reducing agent, substantially neutralizing the acidity of the solution, adding a base and a compound of copper to the solution, subjecting the neutralized solution to the action of air in a finely disseminated state whereby substantially all of the iron present in the solution is precipitated, and removing the iron precipitate from the solution.

4. A method of purifying an acid zinc sulphate solution containing ferric iron in solution, which comprises converting the ferric iron to ferrous iron by the action of an appropriate reducing agent, substantially neutralizing the acidity of the solution and then subjecting the solution to an oxidizing treatment in the course of which the ferrous iron therein is oxidized to an insoluble precipitate of ferric iron, and removing the ferric iron precipitate from the solution.

5. The method of purifying an acid zinc sulphate solution containing iron in both the ferric and ferrous forms, which comprises subjecting the solution to a preliminary treatment including neutralization and removal of ferric iron, then subjecting the solution to an oxidizing treatment in the course of which the ferrous iron therein is oxidized to an insoluble precipitate of ferric iron, and removing the ferric iron precipitate from the solution.

6. The method of purifying an acid zinc sulphate solution containing ferric and ferrous iron, which comprises neutralizing the acidity of the solution whereby the ferric iron is precipitated, removing the ferric iron precipitate from the solution, adding a base in an amount sufficient to neutralize the acid liberated in the subsequent precipitation of iron, then subjecting the solution to an oxidation treatment to transform the ferrous iron to ferric iron and precipitate the ferric iron thus formed, and removing the iron precipitate from the solution.

7. The method of purifying an acid zinc sulphate solution containing iron in both the ferric and ferrous forms, which comprises subjecting the solution to a preliminary treatment in the course of which the acidity of the solution is neutralized and the solution is substantially freed of iron in the ferric form, then subjecting the solution to an oxidizing treatment in the course of which the ferrous iron therein is oxidized to an insoluble precipitate of ferric iron, and removing the ferric iron precipitate from the solution.

JOSEPH CAMILLUS THOMPSON, Jr.